May 15, 1956 — A. A. ROBILLARD — 2,746,002
BATTERY OF ACCUMULATORS AND BENCH FOR CHARGING THIS BATTERY
Filed Dec. 28, 1954 — 6 Sheets-Sheet 1
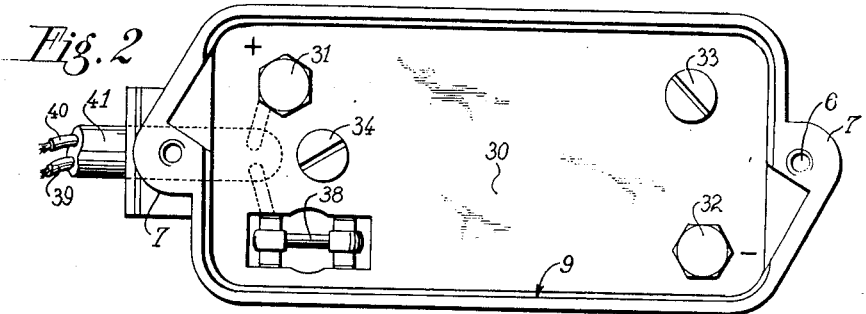
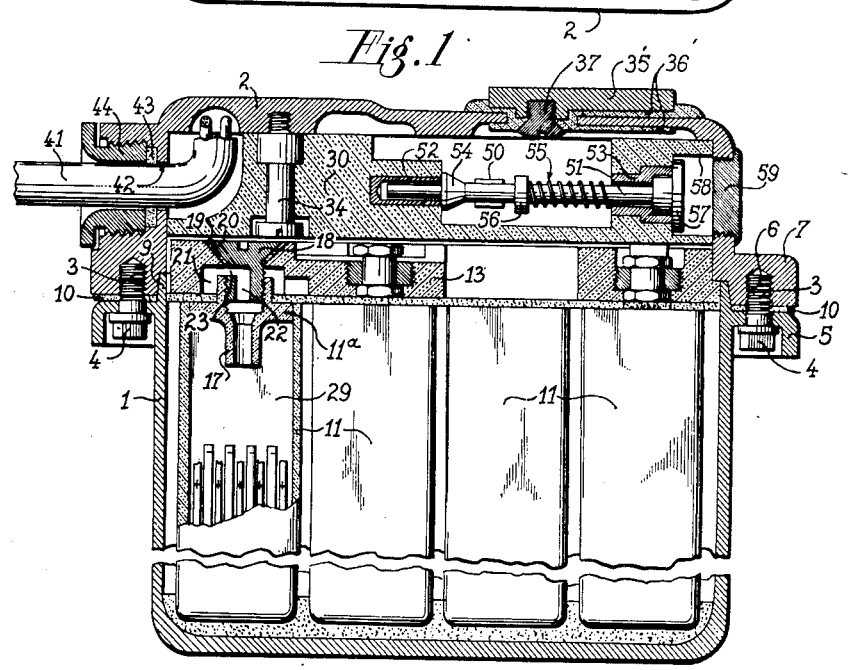
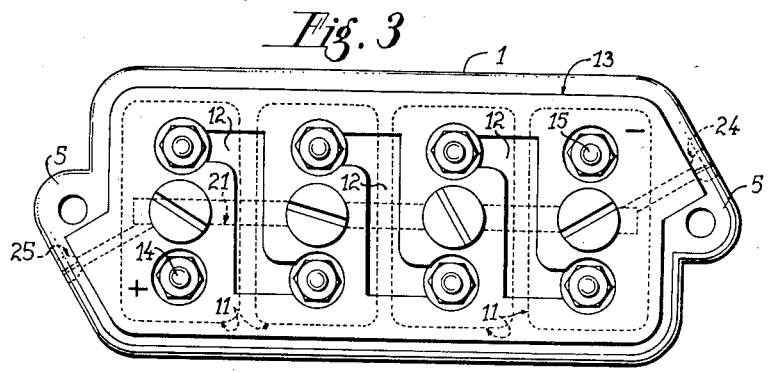
André Albert Robillard
INVENTOR
By Richardson, David and Norton
his ATTYS.

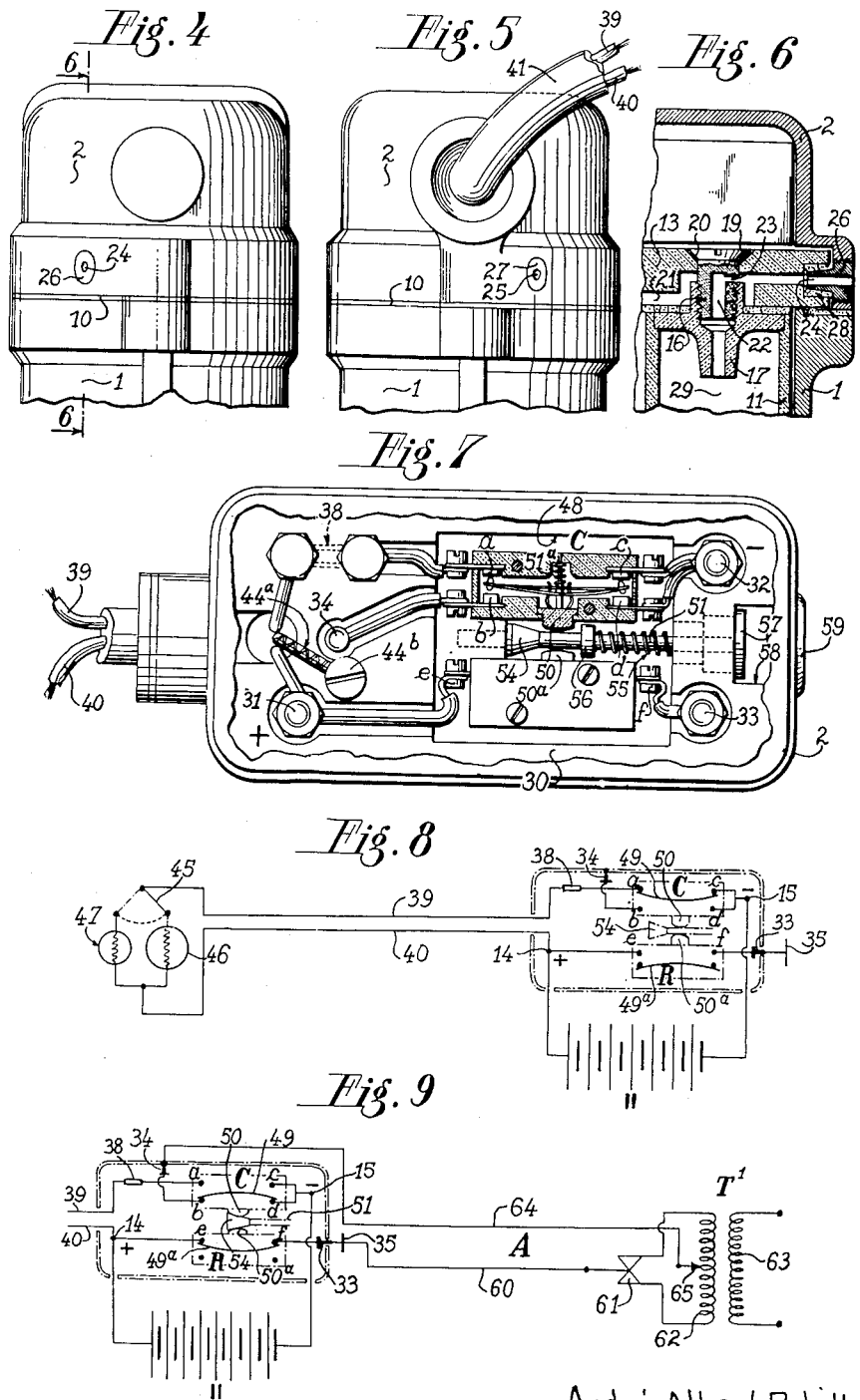

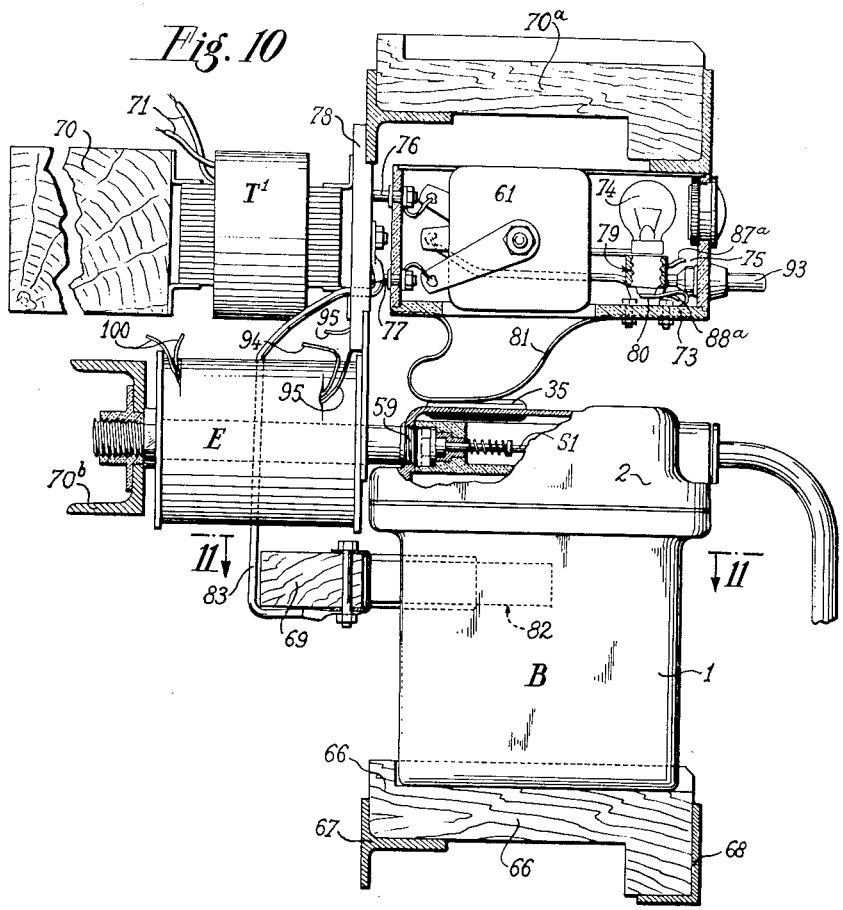
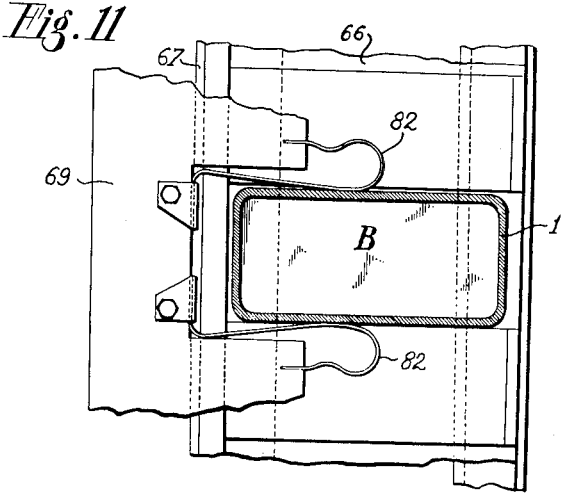

May 15, 1956     A. A. ROBILLARD     2,746,002
BATTERY OF ACCUMULATORS AND BENCH FOR CHARGING THIS BATTERY
Filed Dec. 28, 1954     6 Sheets-Sheet 4
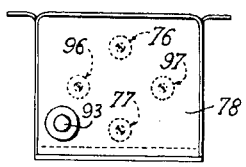
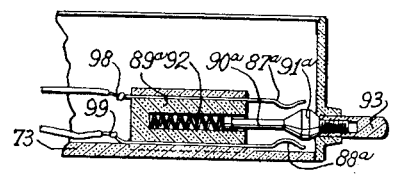
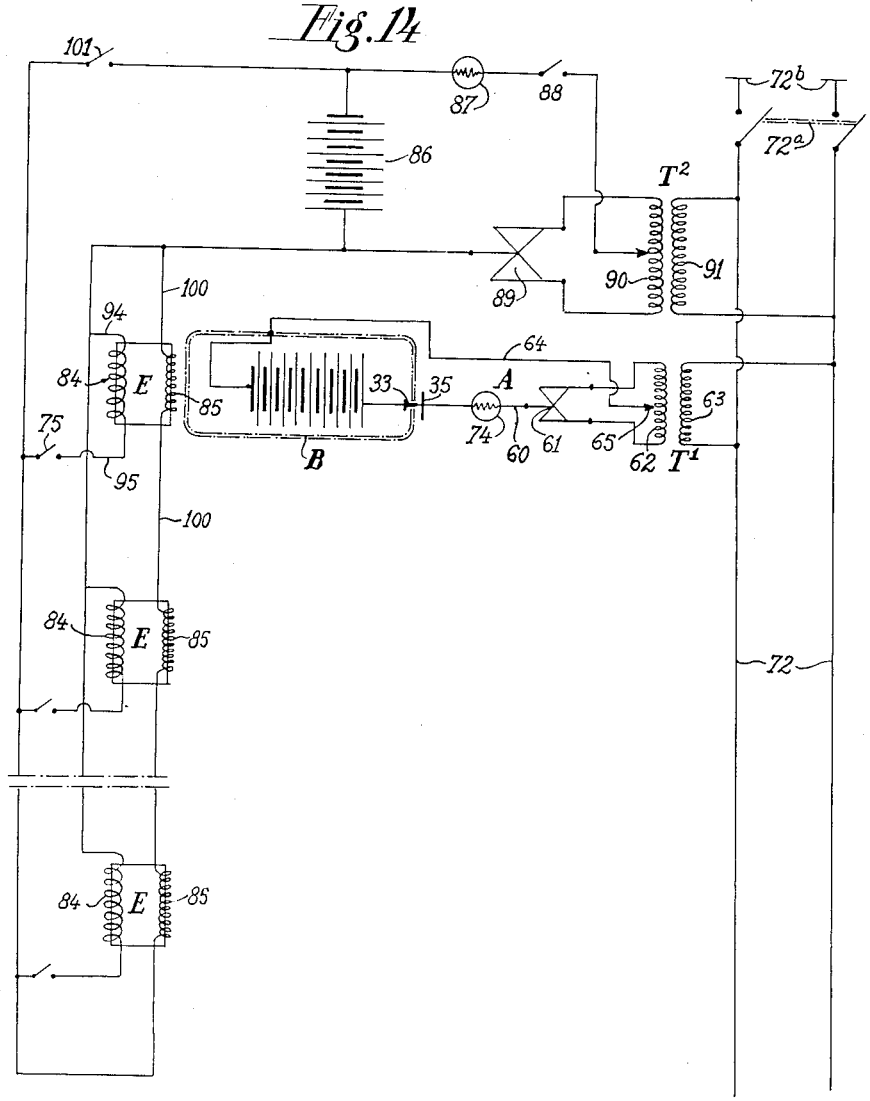
André Albert Robillard
INVENTOR

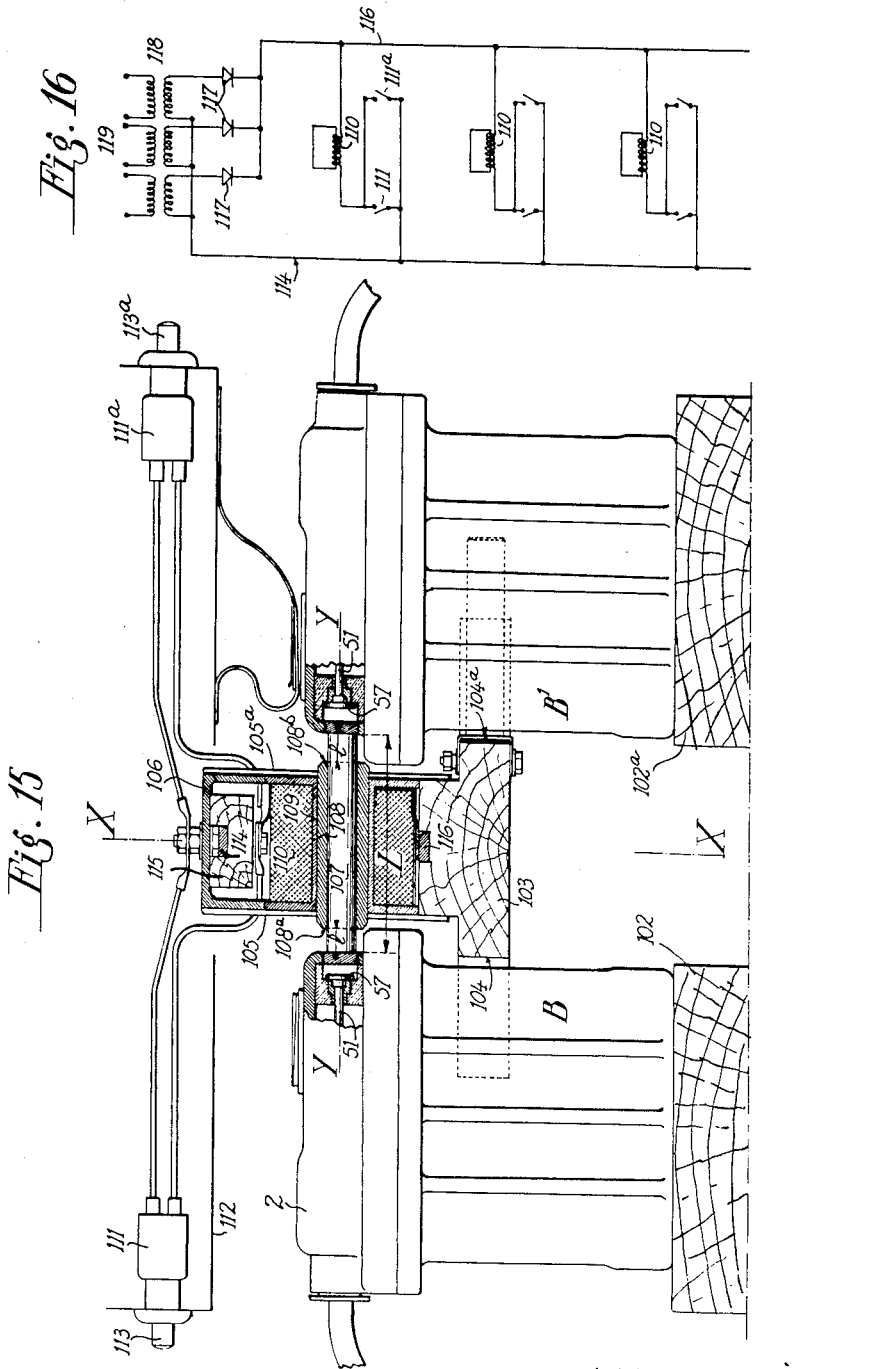

May 15, 1956  A. A. ROBILLARD  2,746,002
BATTERY OF ACCUMULATORS AND BENCH FOR CHARGING THIS BATTERY
Filed Dec. 28, 1954  6 Sheets-Sheet 6
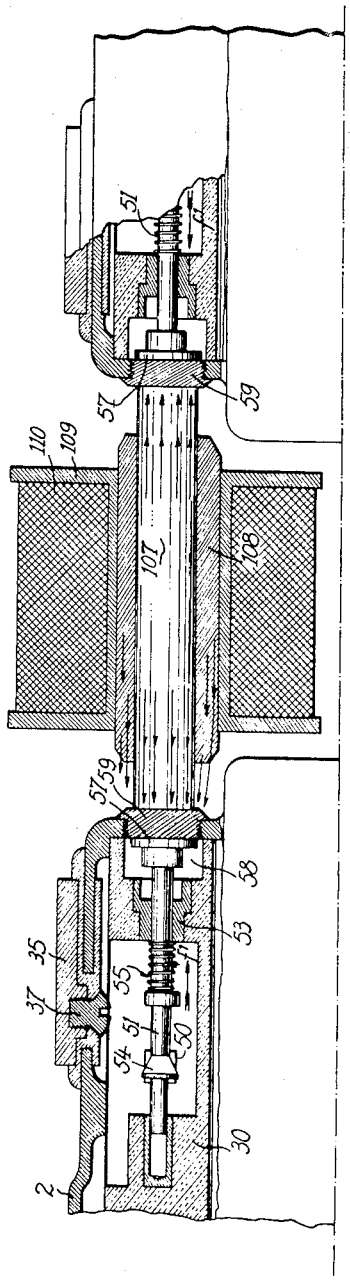
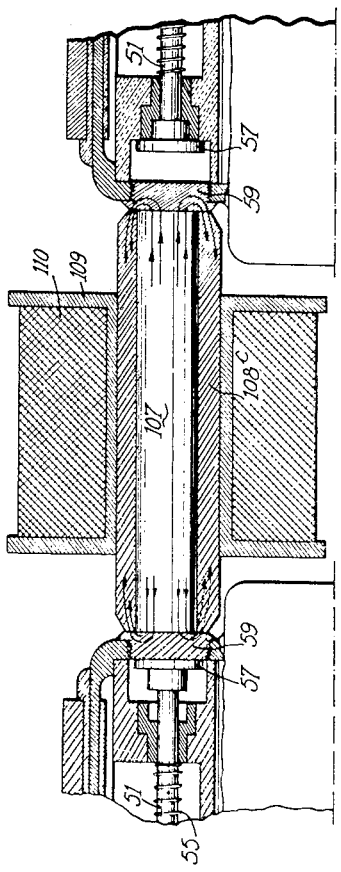
André Albert Robillard
INVENTOR United States Patent Office 2,746,002
Patented May 15, 1956

2,746,002

BATTERY OF ACCUMULATORS AND BENCH FOR CHARGING THIS BATTERY

André Albert Robillard, Douai, France, assignor to Compagnie Auxiliaire des Mines, Douai, France, a French body corporate Application December 28, 1954, Serial No. 478,012

Claims priority, application France January 4, 1954

20 Claims. (Cl. 320—2)

The present invention relates to batteries of accumulators and in particular to batteries adapted to supply power to miners' lamps. In the latter case, as is known, the battery must be absolutely safe to use in that no spark must occur between uncovered parts that are likely to be in contact with fire damp.

The present invention provides a solution to this problem. It has notably for object to provide a battery of accumulators in which its perfectly sealed housing contains a switching device which permits establishing the battery charging and discharging circuits, the operating means of this switching device comprising a metal member which is also wholly disposed in this housing and is actuated from outside the latter by means of an electromagnetic attraction, this housing comprising, for this purpose, in front of this member a magnetic body.

Another object of the invention is to provide a charging bench adapted to charge one or several batteries of the afore-mentioned improved type, this bench comprising for each battery an electromagnetic device which, when it is excited, attracts the movable member of the switching device of the battery into the position thereof corresponding to a closed charging circuit.

Further features and advantages of the invention will appear from the ensuing description.

In the accompanying drawing given merely by way of example:

Fig. 1 is a longitudinal sectional view of a battery of accumulators improved in accordance with the invention;

Fig. 2 is a view of the underside of the cover for this battery;

Fig. 3 is a plan view of the battery, the cover having been removed;

Figs. 4 and 5 are two views of two upper portions of the sides of the battery;

Fig. 6 is a vertical fragmentary sectional view along line 6—6 of Fig. 4;

Fig. 7 is a plan view of the cover the upper side of which has been broken away;

Figs. 8 and 9 are two electric diagrams corresponding respectively to the discharging and charging of the battery;

Fig. 10 is a vertical cross-sectional view of the charging bench which is adapted to charge at least one battery embodying the invention;

Fig. 11 is a horizontal partial sectional view along line 11—11 of Fig. 10;

Fig. 12 is a fragmentary view of the connecting plate provided in the bench in the region of each charging station;

Fig. 13 is a sectional view of the contactor provided in this station;

Fig. 14 is an electric diagram of the charging bench and of a battery on charge;

Fig. 15 is a vertical cross-sectional view of another charging bench improved in accordance with the invention the two batteries being shown before and after charging;

Fig. 16 is an electric diagram relating to this charging bench;

Fig. 17 is a partial sectional view of two batteries of accumulators in process of being charged and of the corresponding electromagnetic device, this view being on a scale larger than that of Fig. 15; and Fig. 18 is a partial sectional view of an electromagnetic device having a plunger and magnet of identical length and which are inoperable, this Fig. 18 being intended to demonstrate why the solution it represents is impracticable.

According to the embodiment shown in Figs. 1 to 7, the battery of accumulators embodying the invention comprises a metal housing or case adapted to protect the various constituent parts from extraneous shocks or blows. This housing comprises two elements, a body 1 and a cover 2, both of which are of aluminium alloy or any other moulded material. The cover 2 may be clamped on the body 1 by means of screws 3 having triangular heads 4 and which extend through lugs 5 provided on the body 1 and are screwed in tapped holes 6 formed in lugs 7 provided on the cover (Figs. 1 and 2).

This cover comprises a recess 9 in which the upper edge of the body 1 is adapted to fit. The interior of the housing is perfectly sealed off from the exterior by means of a gasket 10 (Figs. 1, 4 and 5) gripped between the body 1 and the cover 2.

The battery itself comprises a number of cells, in the illustrated example four cells 11 (Figs. 1 and 3), which are preferably of the silver or zinc type such as type 10N manufactured by the French company Andyar of Neuilly-sur-Seine, France. The electrolyte is alkaline. The capacity of this electrolyte is 10 a./hr. in 10 hours. The voltage at the terminals when on discharge is in the neighbourhood of 6 volts. The four cells of the battery are connected in series (Fig. 3) by means of connections 12 which gives at the beginning of the discharge and during a relatively short time a voltage in the neighbourhood of 7 volts and at the end of the discharge 6 volts. The four cells are fixed and connected on an insulating block 13 which protrudes from the body 1. The two positive and negative poles 14 and 15 protrude from this block 13.

The gases produced when charging the battery are evacuated in the following manner (Figs. 1, 3–6):

Situated at the centre of the cover 11ᵃ of each cell 11 is a nozzle or tube 17 in which is screwed a plug 18 whose countersunk head rests in a conical seating 19 formed in the insulating block 13, a compressible washer 20 being provided for preventing escape of gases from the cells through the insulating block. This arrangement of the plugs 18 renders the interior of the housing gas-tight and permits canalizing these gases in a collector 21, which communicates with the nozzle 17 and the corresponding cell 11 through passageways 22 and 23 provided in axial and radial directions in the plug 18. The collector 21 also communicates with the exterior through two orifices 24 and 25 (Figs. 3 to 6) of small diameter provided in bushings 26 and 27 screwed in the body 1 with the interposition of washers 28 (Fig. 6). Thus the gases formed in the chamber 29 of each cell 11 when charging the battery pass through the nozzle 17, the passageways 22 and 23 of the plug 18, the collector 21 in the block 13 and issue from the orifices 24 and 25.

These two small orifices 24 and 25 prevent, during utilization of the battery at the bottom of a mine, fire damp from penetrating the collector 21 which remains full of the gas discharged during the previous charging. Thus, entry of fire damp in the mine and while the battery is on discharge causes no inconvenience since the outlet circuit of the gases contains no movable element capable of generating sparks. The fact that fire damp is prevented from penetrating the collector 21 ensures that a small amount of this harmful gas is not given off during the following charging of the battery, in the charging shop.

Disposed in the cover 2 is a support 30 of an insulating material. This support may be seen in section in Fig. 1, its underside in Fig. 2 and its top in Fig. 7. Protruding from its underside are two terminals 31 and 32 (Fig. 2) which are adapted to enter into contact with the polar terminals 14 and 15, respectively, of the battery (Fig. 3).

Extending through this support are two screws 33 and 34 which are intended to close the circuit during charging. The screw 33 is permanently connected to a positive external terminal 35 (Figs. 8 and 9) which is secured to the cover 2 (Fig. 1), with the interposition of an insulator 36, by a screw 37 connected to the screw 33. The screw 34 is screwed directly in the cover 2 and is therefore earthed thereto (Fig. 1).

In the lower side of the insulating support 30 is embedded a fuse 38 (Figs. 2, 8 and 9). One of the terminals of this fuse is permanently connected to one of the two conductors 39 of the exterior cable 41 supplied by the battery. The other conductor 40 of this cable is connected to the positive terminal 14. The cable 41 issues from the cover 1 through an opening 42 (Fig. 1) which is sealed by means of a washer 43 gripped by a tubular screw 44. The cable comprises furthermore a cord 44ᵃ which terminates in an eye fixed to the support 30 by a screw 44ᵇ, this cord being intended to relieve the conductors 39 and 40 of harmful stresses in the event of traction on the cable 41.

When the battery is in use the conductors of the cable 41 are connected to the lamp or lamps to be supplied with power for example at will by means of a switch 45 (Fig. 8) connecting a lamp 46 for bright lighting or a lamp 47 for dim lighting.

The upper side of the insulating support 30 is recessed at 48 (Figs. 2 and 7) so as to form, with the cover 2, a chamber for containing a switching device which permits obtaining at will the battery discharging circuit (Fig. 8) or the battery charging circuit (Fig. 9).

It will be observed that this chamber is not strictly in communication with the exterior or with the outlet circuit for the gases so that fire damp cannot in any way enter into contact with it.

The housing 1, 2 is therefore perfectly sealed and no extraneous dust is able to soil the internal elements. Furthermore and above all, air which may be charged with fire damp cannot in any way enter this housing or even, as has been seen above, the collector 21 provided for the outlet of the gases given off during the charging of the battery.

The switching device housed in the chamber 48 comprises a microswitch R and a microcommutator C. Each of these two devices, which are known per se, comprises a bent blade 49 or 49ᵃ which includes two longitudinal slits between which is provided a central portion which cooperates with a push button 50 or 50ᵃ and a return spring such as that shown at 51ᵃ (Fig. 7).

The microcommutator C comprises four terminals a, b, c, and d, and the blade 49 is on the terminals a and c when the push button 50 is not depressed (Fig. 8). When the push button is depressed this blade enters into contact with the terminals b and d.

The microswitch R comprises two terminals e and f with which the blade 49ᵃ is in contact when the push button 50ᵃ is depressed. When the push button is not depressed the switch is open (Fig. 8).

The terminal a is connected to the fuse 38 (Figs. 8 and 9). The terminal b is connected to the earthing screw. The terminals c and d are connected in parallel to the negative terminal 15. The terminal e is connected to the positive terminal 14. The terminal f is connected to the screw 33 and to the outer contact 35.

The simultaneous actuation of the two push buttons 50 and 50ᵃ is obtained by means of a single member comprising a metal rod 51 slidably mounted in bushings 52 and 53 embedded in the insulating support 30. This rod comprises a conical enlargement which forms a wedge and permits depressing the push rods when it enters into engagement therebetween when this rod 51 is displaced towards the right as seen in Figs. 1, and 7. This rod is normally urged to the left by a spring 55 interposed between a flange 56 of the rod and the support 30, but it is displaceable to the right by a magnetic attraction exerted from outside the housing. For this purpose, the rod 51 terminates in an enlarged head 57 which is movable in a recess 58 formed in the support 30 in front of a magnetic body 59 which is screwed in an air-tight manner in the cover 2. It is merely necessary to place an electromagnet in front of the outer flat face of this head 57 to shift the rod 51 from the discharging position shown in Fig. 8 to the charging position shown in Fig. 9. Thus, when the rod 51 is not subjected to a magnetic attraction it is urged by the spring 55 into the position shown in Figs. 1, 7 and 8 and there is obtained the discharging circuit (Fig. 8): battery 11, positive terminal 14, conductor 40, lamp 46 or 47, conductor 39, fuse 38, terminals a and c of the switch C, negative terminal 15, and battery 11.

It will be noticed that there is therefore no current in the housing 1, 2. Even if one of the two conductors 39, 40 of the cable 41 is bared, there is no possibility of a short circuit through the housing.

When the rod 51 is attracted, as will be explained hereinunder, the battery charging circuit is obtained (Fig. 9) and the circuit of utilization or the discharging circuit is cut off across the terminals a and c. The charging circuit is: battery 11, positive terminal 14, terminals e and f of the switch R, screw 33, positive outer terminal 35, exterior charging circuit A, screw 34, that is the mass of the housing 1, 2, terminals b and d of the commutator C, negative terminal 15 and battery 11.

The outer charging circuit comprises two conductors. One of the conductors 60 connects the positive terminal 35 to the positive terminal of a dry rectifier 61 the extreme terminals of which are connected to the two ends of the secondary winding 62 of a charging transformer T¹, the primary winding 63 of the latter being connected to an alternating mains supply. The other conductor 64 connects the mass of the housing 1 to an adjustable point 65 on the secondary winding 62 of the transformer T¹.

Reference will now be had to Figs. 10 to 13, which illustrate a charging bench specially adapted for charging a number of batteries of the improved type just described. The diagram shown in Fig. 14 illustrates at B one of said batteries with the above-described charging circuit A shown in Fig. 9.

According to this embodiment, the charging bench comprises a first horizontal support including an insulating plank 66 which is carried by bars 67 and 68 and on which the batteries B to be charged may be placed side by side, the body 1 of these batteries resting on this bench. Above and at the side of this support is another parallel support 69. Above the latter are provided three other parallel supports 70, 70ᵃ and 70ᵇ.

For each battery to be charged the support 70 carries the transformer T¹. The two ends of the primary winding 63 of this transformer are seen at 71 (Fig. 10). These ends are connected to the conductor 72 of a switch 72ᵃ (Fig. 14) which connects them to the mains supply 72ᵇ.

Fixed under the support 70ᵃ is a case 73 which contains the dry rectifier 61, a signal lamp 74 and a switch 75 to be described hereinunder.

The two ends of the rectifier 61 are connected to the two ends of the secondary winding 62 of the transformer T¹ through the medium of two plugs 76 and 77 (Figs. 10 and 12) which engage in two corresponding sleeves carried by a terminal plate 78 and connected to said secondary winding (Fig. 10). The mid-point of the rectifier is connected to the socket 79 of the signal lamp 74 and the central stud of this lamp is in contact with a blade 80 connected to a spring-blade contact 81 adapted to enter elastically into contact with the positive terminal 35 of the battery. For the purpose of closing the charging circuit, there is provided, carried by the insulating support 69, a metal clamp 82. The latter is connected by a conductor 83 to the mid-point 65 of the transformer T¹.

For the purpose of magnetizing the magnetic body 59 carried by the battery B and so attracting the rod 51, there is provided at each charging station an electromagnet E carried by the support 70ᵇ. This electromagnet includes a main attraction winding 84 (Fig. 14) and a secondary retaining winding 85 adapted to retain the rod in its attracted position. This winding 85 permits a reduction in the consumption of current in the course of charging each battery. These two windings are supplied by a single supply battery 86 for the bench (Fig. 14). This battery is itself charged through a signal lamp 87, a switch 88 and a dry rectifier 89 by the secondary winding 90 or a transformer T² the primary winding 91 of which is connected to the supply line 72.

The main windings 84 of the various electromagnets E are connected in parallel with the common battery 86 and the supply for each of them is controlled by the aforementioned switch 75 housed in the case 73. This switch 75 is so adapted that it remains closed so long as its operating member is depressed. According to the illustrated embodiment in Figs. 10 and 13, this switch comprises two resilient blades 87ᵃ and 88ᵃ carried by an insulating block 89ᵃ secured to the case 73. The movable member of this switch comprises a rod 90ᵃ provided with a conical enlargement 91ᵃ or contact which is normally separated from the blades 87ᵃ and 88ᵃ by the action of a return spring 92. The rod 90ᵃ is capped by a push button 93 which permits, by depressing it and maintaining it in its depressed position, closing the circuit connected to the corresponding winding 84. This winding is connected to the battery 78 by a direct conductor 94 and a conductor 95 including two sections between which the switch is interposed, the two sections of this conductor leading to two plugs 96 and 97 (Fig. 12) connected by conductors 98 and 99 to the blades 87ᵃ and 88ᵃ (Fig. 13).

The secondary windings 85 are connected in series with the battery 86 through conductors 100 (Fig. 14); the general switch 101 controls the various windings.

Between two supports 102 and 102ᵃ the bench comprises a centre support 103 which extends along the entire length of this bench and is provided with opposing recesses 104, 104ᵃ which are adapted to position the pairs of batteries B and B¹ along the bench like a rack.

Connected to this support 103 by uprights 105 and 105ᵃ is a longitudinally extending bar 106 in the form of an inverted U. Between the support 103 and the bar 106 are disposed the various electromagnetic devices pertaining to a pair of batteries.

Each device comprises a permanent magnet constituted by a cylindrical bar 107 having a horizontal axis YY and such length L that its two ends are in contact with two bodies 59 pertaining to the two batteries B and B¹, when the latter are correctly disposed on the supports 102, 102ᵃ. This bar is magnetically saturated and its attraction power is such that it is incapable of displacing each rod 51 in opposition to the action of the spring 55 when this rod is in the discharging position shown in Fig. 15 but is, on the other hand, capable of maintaining this rod in the charging position shown in Fig. 17, when it has been brought into this position by the electromagnet, which will now be described.

Disposed on the bar 107 is a tubular core 108 of soft iron whose ends 108ᵃ and 108ᵇ protrude beyond the two ends of the magnet 107 a distance $l$ of the order of one cm. Disposed around the core 108 is a coil reel 109 of a non-conductive material which is provided with two cheeks between which is disposed the winding 110 of the electromagnet. The core of the latter is constituted by the tubular core 108.

The supply circuit of this winding may be closed by one or other of two switches 111 and 111ᵃ carried at the upper part of the bench by a support 112. Each of these switches comprises a push button 113 and 113ᵃ and is so adapted that the circuit is closed only when one of these buttons is depressed.

The two switches 111 and 111ᵃ are connected in parallel (see in particular Fig. 16) between the winding 110 and a conductor 114 which supplies direct current and is disposed in an insulating element 115 (Fig. 15) fixed to the upper bar 106. The other end of the winding is connected to another conductive bar 116 embedded in the support 113, the latter also being of an insulating material.

Referring now to Fig. 16, said Figure 16 illustrates in side by side relationship several windings 110 each of which pertains to two batteries such as B and B¹ and is connected in parallel with the conductors 114 and 116. The latter are supplied with direct current by means of rectifiers 117 and a three-phase transformer 118 from a three-phase mains supply 119.

The apparatus operates in the following manner:

The switches 111 and 111ᵃ being open, the current is not carried by the winding 110 in question. One of the two batteries or both of them if two persons desire to charge their batteries simultaneously, is or are placed on the support or supports 102 and 102ᵃ so that the or each magnetic body 59 is in contact with the corresponding end of the permanent magnet 107. So long as the current is not established in the winding 110, the heads 57 of the rods 51 are held in the position shown in Fig. 15 by the springs 55. The discharging circuits are established inside the or each battery, the permanent magnet 107 being incapable of overcoming the action of the spring 55 on account of the distance between the head 57 and the magnetic body 59.

As soon as one of the push buttons, 113 or 113ᵃ, is depressed, the current is established in the winding 110 and the resultant magnetic flux induced in the tubular core is added to the magnetic flux of the magnet 107 and attracts, through the medium of the magnetic body 59, the head 57 of the corresponding rod 51. This rod then assumes the position shown in Fig. 16 and establishes inside the battery the charging circuit.

As soon as the push button 113 or 113ᵃ is released, the exciting circuit of the winding 110 is opened but the permanent magnet 107 continues to hold the head 57 of the or each rod 55 against the magnetic body 59 and thereby maintains the battery on charge.

The charging of the battery is of course ensured by the charging circuit outside the battery which is brought into contact with its terminal (35) and its case or housing, for example in the manner described with respect to the first example.

Owing to the permanent magnet 107 it is possible to restrict the current in the winding 110 to the very short period necessary for attracting the rod or rods 51. Thus there is no consumption of current in this winding during the charging period. Furthermore, the current is carried by the winding 110 for only a very short time and it is possible to reduce the cross-section of the wire of this winding, since overheating is avoided; this overheating would have occurred if the winding carried current during the whole of the charging period. Thus, the weight of metal necessary for this winding may be considerably reduced and the space consumed and the cost price likewise reduced.

As has been mentioned above, the tubular core 108 is essential since the magnet 107 cannot perform this function. Indeed, this magnet 107 is magnetically saturated so that applying a voltage to the winding 110 would not increase its attracting power. The latter under these conditions would either be too weak to attract the heads 57 of the rods 51 when they are in the discharging position shown in Fig. 15 or, if it was sufficient, it would be too strong and the withdrawal and return of the rods to the discharging position under the action of the return springs 55 would not be obtained.

Further, it is absolutely essential that the two ends of the magnet 107 protrude to the extent $l$ relative to the two ends of the tubular core 108. Experiments have shown that if the tubular core, such as the core 108c shown in Fig. 8, has the same length as the permanent magnet 107, when the winding 110 receives current each rod 51 is suddenly and forcefully attracted, but when the current is cut off, the rod, which is spring-loaded by the return spring 55, is not held in position, since a magnetic circuit is established directly between the magnet 107 and the core 108c through the medium of the magnetic body 59 in the manner indicated by the arrows, and there is practically no magnetic attraction exerted on the head 57.

This, however, does not occur with the arrangement according to the invention for, when the current is established, all the lines of flux from both the magnet 107 and the core 108 contribute to attract the corresponding head 57 (left side of Fig. 17). After attraction of this head and when the current is cut off in the winding 110, the magnetic flux from the magnet 107 (right side of Fig. 17) continues to attract the head 57 through the magnetic body 59, on account of the separation of the end from the tubular core 108.

Although specific embodiments of the invention have been described it must be understood that the invention is not limited thereto and many changes and modifications may be made therein without departing from the spirit of the invention or the scope of the appended claims.

The bench shown in Fig. 15 has been illustrated as symmetrical with respect to the axis XX, but this is not essential and in this case the permanent magnet need protrude from the magnetic core only at one of its ends, in front of the battery to be charged.

Having now described my invention what I claim as new and desire to secure by Letters Patent is:

1. In a battery of accumulators more particularly for supplying power to mining lamps, in combination: a fully gas-tight housing, disposed in the latter, a switching device for establishing the charging and discharging circuits and provided with a control means comprising a metal element wholly housed in said housing and movable between a position corresponding to discharging and a position corresponding to charging the battery and an elastic device capable of acting on said control means so as to maintain it in the discharging position and a magnetic body disposed in the wall of said housing and facing said control means whereby said control means may be operated from outside said housing by means of an electromagnetic attraction in opposition to the action of said elastic device so as to bring it into the charging position.

2. In combination, on one hand a battery which is more particularly for supplying power to mining lamps and comprises a fully gas-tight housing, a switching device disposed in the latter for establishing the charging and discharging circuits and provided with a control means comprising a metal element wholly housed in said housing and movable in the latter and an elastic device which tends to urge said control means into a position in which the battery discharging circuit is established and a magnetic body disposed in the wall of said housing and facing said control means and, on the other hand, an electromagnetic device outside said housing for displacing said control means by means of an electromagnetic attraction exerted through said magnetic body in opposition to the action of said elastic device so as to displace said control means to another position in which the charging circuit is established.

3. In a battery of accumulators more particularly for supplying power to mining lamps, in combination: a housing body containing the usual cells of the battery, a removable cover fixed on said body, a sealing element disposed between said body and said cover, a switching device disposed in the latter and adapted to establish the charging and discharging circuits for the battery and provided with a control means comprising a metal element which is wholly housed in said cover and is movable between a position corresponding to discharging and a position corresponding to charging the battery and an elastic device capable of acting on said control means for maintaining it in the discharging position, and a magnetic body disposed in the wall of said cover and facing said control means whereby the latter is moved from outside said cover from the discharging position to the charging position by means of an electromagnetic attraction in opposition to the action of said elastic device.

4. In a battery of accumulators more particularly for supplying power to mining lamps, in combination: a fully gas-tight housing, a switching device adapted to establish the charging and discharging circuits for the battery and comprising a microswitch and a microcommutator provided with push buttons disposed facing each other, a rod constituting a control means disposed between said microswitch and microcommutator and provided with an enlargement capable of actuating such push buttons for one longitudinal position of said rod and provided furthermore with a head at one end, and a return spring adapted to displace said rod longitudinally so as to separate said enlargement from said push buttons and thereby establish the discharging circuit; and a magnetic body disposed in the wall of said housing and facing said head whereby the latter is displaced from outside said housing in opposition to the action of said spring by means of an electromagnetic attraction so that said enlargement actuates said microswitch and microcommutator and establishes the charging circuit.

5. In a battery of accumulators more particularly for supplying power to mining lamps, in combination: a housing body containing the usual cells of the battery, a removable cover fixed on said body, a sealing element disposed between said body and said cover, a switching device disposed in the latter and adapted to establish the charging and discharging circuits for the battery and comprising a microswitch and a microcommutator provided with push buttons disposed facing each other, a rod constituting a control means disposed between said microswitch and microcommutator and provided with an enlargement capable of actuating said push buttons for one longitudinal position of said rod and provided furthermore with a head at one end, and a return spring adapted to displace said rod longitudinally so as to separate said enlargement from said push buttons and thereby establish the discharging circuit, and a magnetic body disposed in the wall of said cover and facing said head whereby the latter is displaced from outside said cover in opposition to the action of said spring by means of an electromagnetic attraction so that said enlargement actuates said microswitch and microcommutator and establishes the charging circuit.

6. In a battery of accumulators more particularly for supplying power to mining lamps in combination: a metal housing body containing the usual cells of the battery; a removable metal cover fixed to said body; a sealing element between said body and said cover; an insulating support disposed in the latter; a switching device disposed on said support, adapted to establish the charging and discharging circuits for the battery and provided with a control means comprising a metal member wholly housed in said cover on said support and movable between a discharging position and a charging position and an elastic device acting on said control means so as to maintain it in the discharging position; and a magnetic body disposed in the wall of said cover and facing said control means whereby the latter is displaced from outside said cover, by means of an electromagnetic attraction in opposition to said elastic device, from the discharging position to the charging position.

7. Battery as claimed in claim 6, wherein there are provided a positive terminal fixed in an insulated manner to the outside of said metal cover and two metal connection elements fixed to said insulating support for connecting the two terminals of the cells of the battery, one metal connection element earthing the latter to said metal housing and the other connecting the cells of the battery to said positive terminal.

8. Battery as claimed in claim 6, wherein a second insulating support is disposed below said insulating support, said usual cells of the battery being fixed to said second support.

9. Battery as claimed in claim 8, wherein, for the purpose of evacuating the gases given off during charging, said second insulating support comprises a passageway communicating directly with the exterior of the housing at its ends, this passageway communicating with spaces provided at the upper part of said cells of the battery.

10. Battery as claimed in claim 9, wherein said passageway communicates with the exterior at both ends by way of orifices which are small enough to prevent any entry of gas from the exterior.

11. Charging bench for charging at least one battery of accumulators which is more particularly for supplying power to mining lamps and which comprises a fully gastight housing, a switching device disposed in the latter, adapted to establish the charging and discharging circuits for the battery and provided with a control means comprising a metal element movable in said housing between a discharging position and a charging position and an elastic device ordinarily urging said control means to the discharging position and a magnetic body disposed in the wall of said housing and facing said control means, said bench comprising, for each battery to be charged, an electromagnetic device which permits, by means of an electromagnetic attraction through the medium of said magnetic body, displacing said control means, in opposition to said elastic device, from the discharging position to the charging position.

12. Charging bench for at least one battery of accumulators which comprises a housing with a wall and an inner switching means adapted to be displaced, in opposition to an elastic device, from a discharging position to a charging position by means of an electromagnetic attraction obtained through said wall, said bench comprising an electromagnetic device including an electromagnet provided with at least one attraction winding for attracting said switching means of the battery, a switch controlling the circuit for the winding of said electromagnet so that said circuit is closed only so long as this switch is acted upon, and an auxiliary device for maintaining the internal switching means of the battery in the charging position after it has been attracted.

13. Charging bench as claimed in claim 12, wherein said auxiliary device comprises a secondary winding for said electromagnet.

14. Charging bench as claimed in claim 13, provided with several electromagnets for the purpose of charging simultaneously several batteries and comprising a supply battery and connecting means for connecting the attraction windings of all the electromagnets in parallel with said supply battery and for connecting said secondary windings of said electromagnets in series with said supply battery.

15. Charging bench as claimed in claim 12, wherein said auxiliary device comprises a permanent magnet.

16. Charging bench as claimed in claim 15, wherein said electromagnetic device comprises a permanent magnet in the form of an axial bar, a tubular core of soft iron encompassing the latter, said core having a length less than that of said bar so that the latter protrudes from the core at at least one end and an insulating reel disposed on said core and in which is disposed the winding for the electromagnet.

17. Charging bench as claimed in claim 16, wherein said electromagnetic device is symmetrical so as to permit charging two batteries placed on either side thereof, said bar protruding at both ends from said tubular core.

18. Charging bench as claimed in claim 17, which is symmetrical about a vertical longitudinal plane and in which there is provided in the supply circuit for the winding of the reel two switches having push buttons connected in parallel and disposed on either side of the bench.

19. Charging bench as claimed in claim 18, comprising two supports for receiving at least a pair of batteries and two superimposed bars fixed together and disposed above these supports and spanning the median plane, insulated conductors for the arrival and departure of the current for the winding carried by these bars and the reel carrying this winding, the tubular core and axial magnet being disposed between said bars.

20. Charging bench as claimed in claim 19, comprising several electromagnetic devices for charging several pairs of batteries and in which the lower bar comprises recesses in its longitudinal sides and thus forms a positioning rack for the pairs of batteries.

References Cited in the file of this patent

UNITED STATES PATENTS

| | | |
|---|---|---|
| 359,900 | Starr | Mar. 22, 1897 |
| 1,425,689 | Powell | Aug. 15, 1922 |
| 2,622,233 | Field | Dec. 6, 1952 |